May 28, 1946.   R. G. LE TOURNEAU   2,400,868
ELECTRIC POWER STEERING MECHANISM
Filed Dec. 26, 1944   3 Sheets-Sheet 1

Inventor
R. G. LeTourneau
By
Attorneys

May 28, 1946.      R. G. LE TOURNEAU      2,400,868
ELECTRIC POWER STEERING MECHANISM
Filed Dec. 26, 1944      3 Sheets-Sheet 2
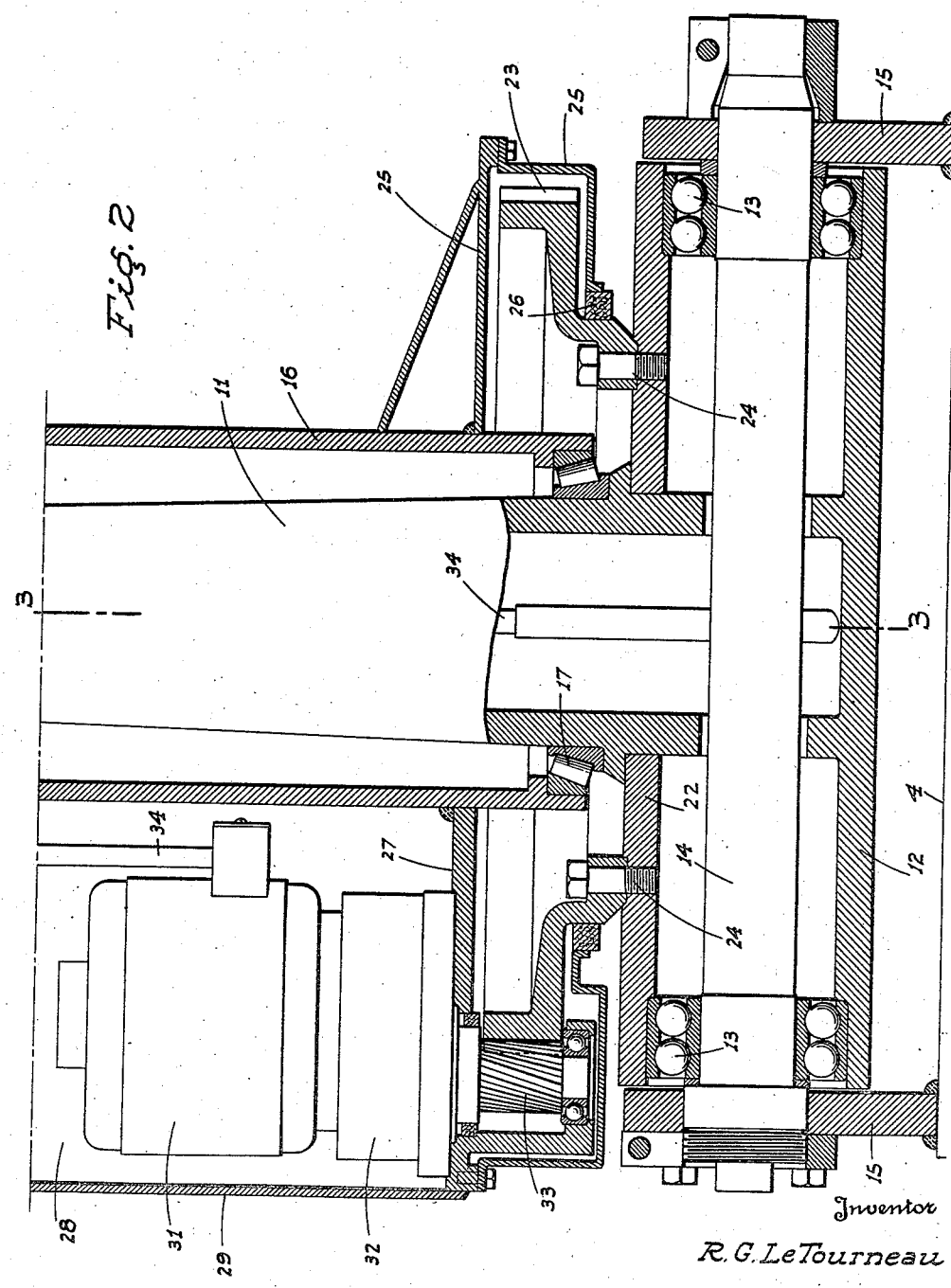
Inventor
R. G. LeTourneau

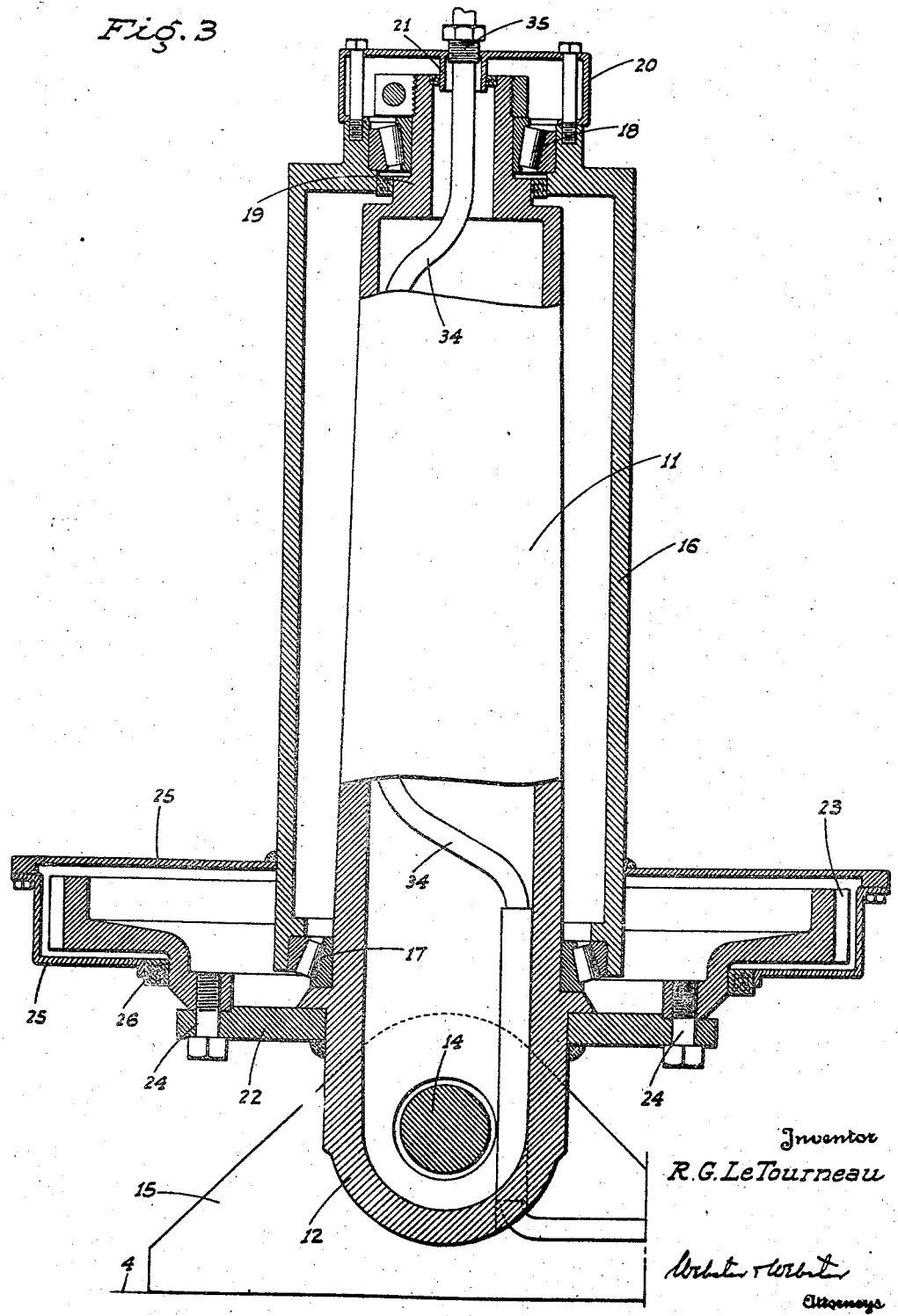

Patented May 28, 1946

2,400,868

UNITED STATES PATENT OFFICE 2,400,868

ELECTRIC POWER STEERING MECHANISM

Robert G. Le Tourneau, Peoria, Ill., assignor to R. G. Le Tourneau, Inc., Stockton, Calif., a corporation of California Application December 26, 1944, Serial No. 569,815

14 Claims. (Cl. 180—79.1)

The present invention is directed to, and it is an object to provide, a novel power steering device incorporated in the draft assembly between a tractor of two-wheel type and a trailing implement; such steering device being operative independently of the tractor wheels to cause relative horizontal angling or steering between the tractor and trailer while permitting of relative lateral tilting thereof as uneven ground is traversed.

A further object of this invention is to provide a power steering device which is actuated by an electric motor.

It is also an object to provide, as unitary coupling and steering means between a tractor and a trailer, a rigid draft unit projecting forwardly from the tractor, a pair of members connected for relative rotation about a generally vertical axis, one member being included in fixed connection in the draft unit and the other member being secured to the tractor for relative lateral tilting movement but fixed lengthwise of said tractor, a prime mover mounted on the draft unit, and drive mechanism between the prime mover and said other member operative to cause relative rotation therebetween in reverse directions, selectively.

Another object of the invention is to provide a power steering device, for a tractor and trailer combination, which includes an upstanding kingpin rotatably mounted in connection with the front end portion of a rigid draft unit projecting forwardly from the trailer, a base on the lower end of the king pin secured on the tractor at the rear for relative lateral tilting movement but fixed lengthwise of the tractor, and drive mechanism fixed in connection with the draft unit and operative to cause relative rotation of said king pin in reverse directions, selectively.

An additional object of the invention is to provide a power steering device, of the type described, which includes an upstanding king pin assembly mounted on the tractor adjacent the rear for relative lateral tilting movement but rigid lengthwise of the tractor, said king pin assembly including an upstanding structure rotatable relative to the tractor about a generally vertical axis, the trailer having a rigid draft unit projecting forwardly and fixed to said structure, a prime mover such as a reversible electric motor mounted in connection with and supported by said structure, and prime mover actuated drive mechanism incorporated in the king pin assembly and operative to cause rotation of said structure relative to the tractor, whereby to cause steering of the tractor while permitting of relative lateral tilting between said tractor and the trailer.

A further object of the invention is to produce a simple and inexpensive device and yet one which will be exceedingly effective for the purpose for which it is designed.

These objects are accomplished by means of such structure and relative arrangement of parts as will fully appear by a perusal of the following specification and claims.

In the drawings similar characters of reference indicate corresponding parts in the several views:

Figure 2 is an enlarged fragmentary longitudinal sectional elevation of the steering device.

Figure 3 is a section on line 3—3 of Fig. 2.

Figure 1:
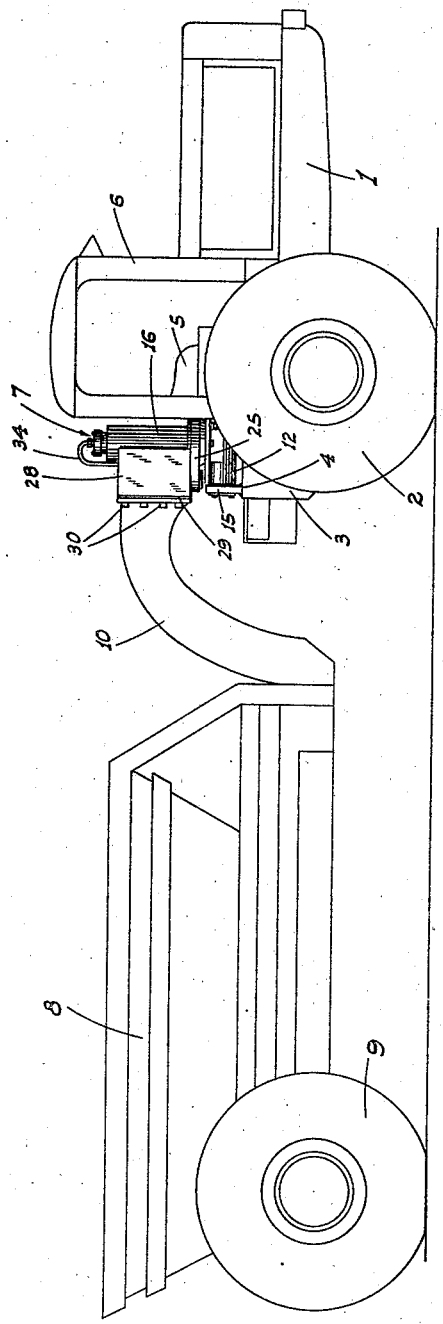
Figure 1 is a side elevation of a tractor and trailer combination incorporating the present invention.

Referring now more particularly to the characters of reference on the drawings, the numeral 1 indicates generally a two-wheel tractor of the "Tournapull" type which includes a pair of transversely spaced ground engaging drive wheels 2 between which a transmission case 3 is disposed, the rear portion of said transmission case having an upwardly facing exposed deck 4. The operator's seat 5 is disposed ahead of the deck 4 and in the present embodiment is enclosed within a cab 6.

The power steering device, which is indicated generally at 7, is mounted on the upstands from the deck 4; such device providing a unitary coupling and steering means between the tractor 1 and a trailer 8 which includes transversely spaced ground engaging wheels 9; the trailer here being shown as an earth carrying wagon, but which obviously may be any type of trailing implement. The trailer 8 includes a forwardly projecting rigid draft tongue or gooseneck 10 which is rigidly but detachably secured to the steering device 7 in the manner which will hereinafter appear in detail.

The steering device 7, which embodies the essence of the present invention, comprises the following structural arrangement:

A heavy-duty tubular king pin 11 is disposed about the deck 4 in upstanding relation, said king pin being fixed at its lower end in connection with a longitudinally extending base 12 which is here shown as of generally tubular construction. The base 12 is mounted for rotation about a horizontal axis lengthwise of the tractor by means of end bearings 13 carried on a fixed shaft 14, which is supported at opposite ends by brackets 15 secured on and upstanding from the deck 4 in spaced relation lengthwise of the tractor. As so mounted the king pin is capable of lateral tilting movement in either direction from vertical, but is fixed against tilting movement lengthwise of the tractor.

A heavy-duty tubular sleeve 16 surrounds the king pin 11 from end to end thereof, said sleeve being supported against axial displacement but rotatably mounted on the king pin 11 by means of a bottom bearing unit 17 and a top bearing unit 18, the top bearing unit being associated with a trunnion 19 formed on the upper end of the king pin. A protecting cap 20 is mounted on the upper end of the sleeve 16 and encloses the bearing 18 and trunnion 19; the trunnion 19 being hollow and the protecting cap 20 including a neck 21 which extends from a top opening in said cap into the trunnion as shown, and for the purpose hereinafter described.

The tubular longitudinally extending base 12 is formed at the top and intermediate its ends with a flat attachment plate 22 which extends in fixed relation about the king pin 11 adjacent its lower end. A relatively large-diameter external ring gear 23 is seated on and secured to the attachment plate 22 by means of cap screws 24; said gear surrounding the lower end portion of the king pin 11 in fixed concentric relation. The gear 23 is enclosed by an annular protective housing 25 fixed in connection and movable with the sleeve 16; the housing 25 including an annular seal 26 which runs against the gear adjacent the bottom thereof.

To one side of the sleeve 16 the housing 25, at the top, is formed as a heavy supporting platform 27, and said platform forms the bottom of an upstanding rearwardly facing motor housing 28 which includes a horizontal rearwardly facing back plate 29. The motor housing 28 is of heavy-duty construction and is formed in unitary relation with the sleeve 16. The forward end of the draft gooseneck 10 abuts in matching relation against back plate 29 and is detachably secured thereto by bolts 30. By means of this arrangement the draft gooseneck 10 is connected in rigid relation with the upstanding sleeve 16 which is turnable about the king pin 11; said housing 28, together with the sleeve 16 and king pin 11 forming what may be termed the king pin assembly of the device.

A prime mover in the form of a reversible electric motor 31 is mounted in the housing 28 and includes a reduction gear box 32 which drives a downwardly projecting pinion 33 which is in mesh with the gear 23. The electric conduit for the motor 31 is indicated at 34 and extends upwardly through the top of motor housing 28 and thence downwardly through a fitting 35 in the upper end of the neck 21 of protective cap 20. The conduit then passes through the hollow trunnion 19 and extends down through the king pin 11 into the tubular base 12, from which the conduit turns out adjacent the shaft 14, whereby the king pin assembly may tilt laterally about said shaft as an axis without imparting undue motion to said conduit. From the base 12 the conduit leads forwardly into the tractor, which includes a tractor engine actuated generator and a manually controlled reversing switch (not shown).

The above described unitary coupling and steering device between the tractor 1 and draft gooseneck 10 of the trailer 8, functions as follows to effect steering movement of the tractor relative to the trailer:

When the electric motor 31 is driven in one direction or the other it causes a corresponding drive of the pinion 33. With rotation of such pinion the gear is rotated to correspondingly rotate the king pin within the sleeve 16, which in turn imparts a rotative or steering motion to the tractor relative to the trailer. By reason of the fact that the above drive mechanism is incorporated in its entirety in the king pin assembly the tractor and trailer may independently tilt laterally relative to each other as said vehicles traverse uneven ground; such relative lateral tilting being possible by reason of embodiment in the device of the base 12 which extends lengthwise of the tractor but is mounted for rotation about an axis longitudinally of said tractor.

From the foregoing description it will be readily seen that there has been produced such a device as substantially fulfills the objects of the invention as set forth herein.

While this specification sets forth in detail the present and preferred construction of the device, still in practice such deviations from such detail may be resorted to as do not form a departure from the spirit of the invention as defined by the appended claims.

Having thus described the invention, the following is claimed as new and useful and upon which Letters Patent is desired:

1. A power steering device for a tractor and trailer combination wherein the trailer includes a draft element projecting forwardly in normally rigid relation, said device comprising a pair of members mounted together for relative rotation about an upstanding axis, means rigidly connecting one member and the draft element together as a unit, means securing the other member to the tractor in a manner to effect steering of the tractor upon rotation of such other member, a prime mover mounted on said unit, and prime mover actuated drive means connected between said members operative to cause relative rotation therebetween.

2. A power steering device for a tractor and trailer combination wherein the trailer includes a draft element projecting forwardly in normally rigid relation, said device comprising a pair of members mounted together for relative rotation about an upstanding axis, means rigidly connecting one member and the draft element together as a unit, means securing the other member to the tractor in a manner to effect steering of the tractor upon rotation of such other member, a prime mover mounted on said unit, and prime mover actuated drive means connected between said members operative to cause relative rotation therebetween; said prime mover being an electric motor.

3. A steering device as in claim 2 in which the electric motor is reversible.

4. A power steering device for a tractor and trailer combination wherein the trailer includes a draft element projecting forwardly in normally rigid relation, said device comprising a pair of members mounted together for relative rotation about an upstanding axis, means rigidly connecting one member and the draft element together as a unit, means securing the other member to the tractor in a manner to effect steering of the tractor upon rotation of such other member, a prime mover mounted on said unit, and prime mover actuated drive means connected between said members operative to cause relative rotation therebetween; said drive means including a gear fixed in connection with said other member, and a pinion driven by the prime mover and in mesh with the gear.

5. A power steering device for a tractor and trailer combination wherein the trailer includes a draft element projecting forwardly in normally rigid relation, said device comprising a pair of members mounted together for relative rotation about an upstanding axis, means rigidly connecting one member and the draft element together as a unit, means securing the other member to the tractor for lateral tilting and in a manner to effect steering of the tractor upon rotation of such other member, a prime mover mounted on said unit, and prime mover actuated drive means connected between said members operative to cause relative rotation therebetween.

6. A power steering device for a tractor and trailer combination wherein the trailer includes a draft element projecting forwardly in normally rigid relation, said device comprising an upstanding king pin, means mounting the king pin on the tractor adjacent the rear thereof for lateral tilting and in a manner to effect steering of the tractor upon rotation of such king pin, a cooperating structure turnable about the king pin, means rigidly connecting the draft element and said structure as a unit, a prime mover mounted on said unit, and prime mover actuated drive means between said structure and the king pin operative to cause relative rotation therebetween.

7. A power steering device for a tractor and trailer combination wherein the trailer includes a draft element projecting forwardly in normally rigid relation, said device comprising an upstanding king pin, means mounting the king pin on the tractor adjacent the rear thereof for lateral tilting and in a manner to effect steering of the tractor upon rotation of such king pin, a cooperating structure turnable about the king pin, means rigidly connecting the draft element and said structure as a unit, a prime mover mounted on said unit, and prime mover actuated drive means between said structure and the king pin operative to cause relative rotation therebetween; said drive means comprising a gear fixed concentrically in connection with the king-pin, and a drive pinion journaled in connection with said structure and meshing with the gear.

8. A power steering device for a tractor and trailer combination wherein the trailer includes a draft element projecting forwardly in normally rigid relation, said device comprising an upstanding king pin, means mounting the king pin on the tractor adjacent the rear thereof for lateral tilting and in a manner to effect steering of the tractor upon rotation of such king pin, a cooperating structure turnable about the king pin, means rigidly connecting the draft element and said structure as a unit, an electric motor mounted on said unit, a gear fixed concentrically in connection with the king-pin, and a motor driven pinion journaled on said structure and meshing with the gear.

9. A power steering device for a tractor and trailer combination wherein the trailer includes a draft element projecting forwardly in normally rigid relation, said device comprising an upstanding king pin, means mounting the king pin on the tractor adjacent the rear thereof for lateral tilting and in a manner to effect steering of the tractor upon rotation of such king pin, a cooperating structure turnable about the king pin, means rigidly connecting the draft element and said structure as a unit, a gear fixed concentrically in connection with the king pin, a drive pinion journaled in said structure and meshing with the gear, and a prime mover mounted on said structure operative to reversibly drive said pinion.

10. A power steering device for a tractor and trailer combination wherein the trailer includes a draft element projecting forwardly in normally rigid relation, said device comprising an upstanding king pin, means mounting the king pin on the tractor adjacent the rear thereof for lateral tilting and in a manner to effect steering of the tractor upon rotation of such king pin, a sleeve turnably mounted on the king pin, an electric motor, a housing in which the motor is mounted, said housing being fixed on and supported by the sleeve, a gear fixed concentrically in connection with the king pin beyond one end of the sleeve, a motor driven pinion journaled in connection with the adjacent end of the housing and in mesh with said gear; the forward end of the draft element being rigidly attached to the sleeve and housing assembly.

11. A steering device as in claim 10 in which the housing is disposed alongside and normally to the rear of the sleeve; the draft element being attached to said housing.

12. A power steering device for a tractor and trailer combination wherein the trailer includes a draft element projecting forwardly in normally rigid relation, said device comprising an upstanding king pin, means mounting the king pin on the tractor adjacent the rear thereof for lateral tilting and in a manner to effect steering of the tractor upon rotation of such king pin, a sleeve turnably mounted on the king pin, an electric motor, a housing in which the motor is mounted, said housing being fixed on and supported by the sleeve, a gear fixed concentrically in connection with the king pin beyond one end of the sleeve, a motor driven pinion journaled in connection with the adjacent end of the housing and in mesh with said gear; the housing being disposed alongside and normally to the rear of the sleeve, the draft element being rigidly attached to the housing, and another housing supported by the sleeve and surrounding said gear and pinion in protective relation.

13. A power steering device for a tractor and trailer combination wherein the trailer includes a draft element projecting forwardly in normally rigid relation, said device comprising an upstanding king pin, a base fixed on the lower end of the king pin, means mounting said base on the tractor adjacent the rear in laterally tiltable but longitudinally immovable relation to the tractor, a structure relatively rotatably supported by the king pin, means rigidly connecting the draft element and said structure as a unit, and power driven means connected between the structure and king pin operative to cause relative rotation therebetween; said power driven means being actuated by a prime mover mounted in connection with and supported by said relatively rotatable structure.

14. A power steering device for a tractor and trailer combination wherein the trailer includes a draft element projecting forwardly in normally rigid relation, said device comprising a longitudinally extending base member disposed adjacent the rear of the tractor, a king pin rigid with and upstanding from the base member, means journaling the base member on the tractor for rotation about the longitudinal axis of said member whereby the king pin is laterally tiltable, a sleeve rotatably mounted on the king pin, an electric motor, a housing in which the motor is mounted, said housing being rigidly attached to the sleeve, the draft element and said housing being rigidly secured together as a unit, a gear fixed concentrically in connection with the king pin below the sleeve, and a motor driven pinion journaled in connection with said housing and meshing with the gear.

ROBERT G. LE TOURNEAU.